United States Patent [19]
Joubert

[11] Patent Number: 4,767,570
[45] Date of Patent: Aug. 30, 1988

[54] SODIUM TRIPOLYPHOSPHATE CARRIER PARTICLES CONTAINING A SODIUM HYDROGEN ORTHO ON PYRO-PHOSPHATE

[75] Inventor: Daniel Joubert, Trevoux, France

[73] Assignee: Rhone-Poulenc Chimie de Base, Courbevoie, France

[21] Appl. No.: 885,677

[22] Filed: Jul. 15, 1986

[30] Foreign Application Priority Data

Jul. 15, 1985 [FR] France .............................. 85/10798

[51] Int. Cl.[4] ......................... C09K 3/00; C11D 7/16; C11D 9/36; C11D 17/06

[52] U.S. Cl. .................................... 252/540; 252/135; 252/136; 252/140; 252/174.13; 252/174.15; 252/358; 23/313 R; 427/220

[58] Field of Search ............... 252/109, 135, 136, 140, 252/321, 358, 174.15, 174.13, 540; 23/313 R; 427/220

[56] References Cited

U.S. PATENT DOCUMENTS

| | | | |
|---|---|---|---|
| 2,990,374 | 6/1961 | Schwartz | 252/136 |
| 3,520,817 | 7/1970 | Caldwell | 252/109 |
| 3,723,327 | 3/1973 | Van Kampen | 252/110 |
| 3,852,212 | 12/1974 | Groening | 252/135 |
| 3,933,672 | 1/1976 | Bartolotta | 252/116 |
| 4,265,779 | 5/1981 | Gandolfo | 252/135 |
| 4,328,114 | 5/1982 | Johnson | 252/135 |
| 4,436,644 | 3/1984 | Johnson | 252/174.13 |

FOREIGN PATENT DOCUMENTS

| | | | |
|---|---|---|---|
| 0110592 | 6/1984 | European Pat. Off. | 252/135 |
| 2532802 | 1/1977 | Fed. Rep. of Germany | 252/135 |

*Primary Examiner*—Dennis Albrecht
*Attorney, Agent, or Firm*—Burns, Doane, Swecker & Mathis

[57] ABSTRACT

Novel carriers for liquid component antifoaming agents, e.g., polysiloxane based, and well adapted for detergency applications, are comprised of a preferably hydrated sodium tripolyphosphate fraction, and a fraction comprised of sodium hydrogen pyrophosphate, sodium hydrogen orthophosphate, or admixture thereof.

19 Claims, No Drawings

SODIUM TRIPOLYPHOSPHATE CARRIER PARTICLES CONTAINING A SODIUM HYDROGEN ORTHO ON PYRO-PHOSPHATE

BACKGROUND OF THE INVENTION

1. Field of the Invention

The present invention relates to a carrier for liquid components of wash formulations, a composition thereof with an antifoaming agent, a process for the preparation thereof and to detergent formulations comprising same.

2. Description of the Prior Art

The use of liquid or solid detergent compositions for washing natural or synthetic textiles is today quite widespread. This washing may be carried out by hand, or automatically, using a washing machine.

In the latter case, the presence of abundant amounts of foam should be avoided, in contrast to manual washing. In fact, abundant foam production may cause the machine to overflow, endangering the electrical system or electronic components thereof.

Thus, attempts have long been made to reduce foam formation by incorporating antifoaming agents in the traditional detergent systems. These antifoaming materials, as well as any other liquid component of wash formulations, must, on the one hand, be in a solid form in order to be readily incorporated into the detergent powder in the case of solid detergent compositions. On the other hand, they must possess satisfactory stability, such that after variable time periods and conditions of storage, their capacity and effectiveness remain unchanged.

The following are exemplary, without limitation, of liquid components of standard detergent formulations: antifoaming agents, perfumes, textile softeners and surfactants of the nonionic type.

It has already been proposed to this art to add, as an antifoaming agent, a relatively high proportion of soaps in which the alkyl chain is long (18 to 20 carbon atoms). These soaps have several disadvantages: they need to be used in considerable amounts, they have an antifoaming capacity which is weakened in very soft water, and they are not universally applicable, namely, they do not display the same antifoaming capacity for wash compositions which are rich in nonionic agents, for wash compositions consisting essentially of soaps, or for traditional wash compositions.

Indeed, the antifoaming agents, as well as certain liquid components of the wash formulations used in solid detergent compositions must possess a certain number of characteristics:

They must be made available in a powdered form, such as to enable their incorporation in the detergent powder after the various heat treatments, because the antifoaming agents, perfumes, and the nonionic materials are typically temperature-sensitive.

They must also exhibit antifoaming activity at all washing temperatures, that is to say, from approximately 15° to 95° and with detergent formulations of all types.

The antifoaming agent or composition too must be stable over time within the detergent formulation. It will be appreciated that the detergent formulation is a formulation which, in the majority of cases, is highly alkaline and highly hygroscopic. This hygroscopicity frequently leads to a hydrolysis of the sensitive compounds, which include the antifoams.

To overcome these problems and to meet most of the abovementioned requirements, certain compositions have been proposed to this art. Thus, French Pat. No. 2,143,815 describes a material reducing foam formation and comprising a powdered or granular sodium tripolyphosphate, on the surface of which is borne an antifoaming composition containing an organopolysiloxane.

This antifoaming material meets the first two requirements, namely, it has on the one hand antifoaming action at all temperatures and with formulations of all types and, on the other hand, it exists in powder form.

Nonetheless, its stability is clearly insufficient and it must therefore be added in large amounts to the washing formulations, and this is unattractive from an economic standpoint.

SUMMARY OF THE INVENTION

Accordingly, a major object of the present invention is the provision of an improved carrier for the liquid components of a wash formulation, said improved carrier meeting each requirement of this art and comprising sodium tripolyphosphate and sodium hydrogen orthophosphate and/or sodium hydrogen pyrophosphate.

DETAILED DESCRIPTION OF THE PREFERRED EMBODIMENTS OF THE INVENTION

More particularly according to the present invention, the sodium tripolyphosphate component preferably has a phase 1 content of more than 50%. It is advantageously obtained by spraying and is preferably in granular form with particles having a mean diameter of approximately 300 μm.

In order that the carrier thus defined mixes more readily with the other components of the wash formulation, the tripolyphosphate preferably has a density of from 0.3 to 0.6.

It is preferred to use a carrier comprising sodium tripolyphosphate and sodium hydrogen pyrophosphate.

The carrier according to the invention preferably has the following composition by weight:

| | |
|---|---|
| Anhydrous sodium tripolyphosphate | 54–67% |
| Sodium hydrogen pyrophosphate | 12–23% |
| Water | 18–23% |

More preferably, the carrier has the following composition:

| | |
|---|---|
| Anhydrous sodium tripolyphosphate | 58–67% |
| Sodium hydrogen pyrophosphate | 12–20% |
| Water | 18–23% |

An outstanding antifoam carrier according to the invention has the following formulation:

| | |
|---|---|
| Anhydrous sodium tripolyphosphate | 60–65% |
| Sodium hydrogen pyrophosphate | 15–18% |
| Water | 20–22% |

This carrier is advantageously prepared by two different methods.

The solid tripolyphosphate and sodium hydrogen pyrophosphate and/or orthophosphate may be mixed dry, and then water may be sprayed onto this mixture, or an aqueous solution of sodium hydrogen pyrophosphate and/or hydrogen orthophosphate may be sprayed onto the anhydrous tripolyphosphate.

An intermediate solution is also within the scope of the invention, and thus an aqueous solution of hydrogen pyrophosphate and/or orthophosphate may be sprayed onto a mixture of tripolyphosphate and hydrogen pyrophosphate and/or orthophosphate.

The antifoaming composition includes the carrier described above and an antifoaming agent.

The antifoaming agent typically comprises:

(a) 100 parts of an organopolysiloxane oil of the formula $R_1SiO(R_2SiO)_nSiR_3$, in which $R_1$, $R_2$ and $R_3$, which are identical or different, are each methyl, ethyl, vinyl or phenyl radicals, at least 80% of said radicals being methyl radicals, and n is an integral or fractional number such as to provide a viscosity of 20 mPa.s to 50,000 mPa.s at 25° C.; and (b) 0.05 to 15 parts, preferably 0.8 to 12 parts, of finely-divided silica particulates having a mean diameter of less than 0.1 micron. The antifoaming agent may optionally contain 0.1 to 10 parts of polymers selected from among:

(c) organopolysiloxane polymers, and especially hydroxylated diorganopolysiloxane oils, comprising $R_3'SiO_{0.5}$ and $SiO_2$ recurring units in which $R_3'$ has the same meaning as $R_3$, and (d) copolymers comprising a dimethylpolysiloxane chain and at least one polyoxyalkylene block.

A more detailed description of these various antifoaming agents and of the process for the preparation thereof is set forth in French Pat. No. 2,509,624.

Insofar as the process for the preparation of the antifoaming composition described earlier is concerned, two possibilities present themselves. The antifoaming composition may be prepared by mixing the antifoaming agent with the carrier such as defined earlier. It may also be prepared by spraying an aqueous emulsion of the antifoaming agent onto the mixture of anhydrous powdered sodium tripolyphosphate and hydrogen pyrophosphate and/or hydrogen orthophosphate. This mixture will preferably be permitted to mature after production for a minimum period of approximately 24 hours.

The antifoaming composition according to the invention preferably contains at most approximately 15% of antifoaming agent by weight, based on the carrier.

In certain cases, it may be coated with a protective material such as paraffins or fatty acids.

These antifoaming compositions may be included in wash formulations of all types, particularly all-soap formulations, nonionic-rich formulations or more traditional formulations.

As an example of a traditional formulation, the following formulation by weight is representative:

(i) Sodium alkylarylsulfonate: 8%

(ii) Nonionic linear long chain fatty alcohol containing 18 carbon atoms ethoxylated with 12 ethylene oxide units: 3%

(iii) Nonionic linear long chain fatty alcohol containing 18 carbon atoms ethoxylated with 50 ethylene oxide units: 2%

(iv) Sodium tripolyphosphate: 30%

(v) Sodium silicate ($2SiO_2.Na_2O$): 8%

(vi) Carboxymethyl cellulose: 1.5%

(vii) Perborate: 25%

(viii) Sodium sulfate: 20%

(ix) Enzyme, perfume, colorant, optical whitener: 2.5%

Preferably, an amount of antifoaming composition is used such that the weight ratio of antifoaming composition to the wash formulation ranges from 0.15 to 0.5% and preferably approximately 0.3%.

In order to further illustrate the present invention and the advantages thereof, the following specific examples are given, it being understood that same are intended only as illustrative and in nowise limitative.

EXAMPLES

Various different carriers were prepared according to the following compositions using a small laboratory granulation dish into which the powder mixture was added and a water-sprayer.

TABLE I

| WEIGHT COMPOSITION OF THE CARRIER (TABLE I): | 1 | 2 | 3 | 4 |
|---|---|---|---|---|
| Anhydrous sprayed TPP | 54 | 58.5 | 63.0 | 67.0 |
| Sodium hydrogen pyrophosphate, $Na_2H_2P_2O_7$ | 23 | 19.5 | 15.75 | 12.0 |
| Water | 23 | 22 | 21.25 | 21.0 |

An antifoaming agent having the following formulation was deposited onto the carriers described above:

95 parts of dimethylpolysiloxane oil terminated at each end of the polymer chain with a trimethylsiloxy group, having a viscosity of approximately 1000 mPa.s at 25° C., and 5 parts of pyrogenic silica having a specific surface area of 300 $m^2/g$, treated with octylmethylcyclotetrasiloxane.

The assessment of antifoaming efficiency was determined using the antifoaming composition as prepared, incorporated beforehand into a wash formulation having the following composition by weight:

(i) Sodium alkylarylsulfonate: 8%

(ii) Nonionic long chain linear fatty alcohol containing 18 carbon atoms and ethoxylated with 12 ethylene oxide units: 3%

(iii) Nonionic long chain linear fatty alcohol containing 18 carbon atoms and ethoxylated with 50 ethylene oxide units: 2%

(iv) Sodium tripolyphosphate: 30%

(v) Sodium silicate: 8%

(vi) Carboxymethyl cellulose: 1.5%

(vii) Perborate: 25%

(viii) Sodium sulfate: 20%

(ix) Enzyme, perfume, colorant, optical whitener: 2.5%

The antifoaming efficiency tests (Table II) were carried out using antifoaming compositions which were not stored and were thus incorporated into the wash formulation and tested immediately, using antifoaming compositions stored for 1 month at 40° C. without the wash formulation and then incorporated into the wash formulation and tested immediately and, lastly, using antifoaming compositions stored for 1 month at 40° C. within the wash formulation.

Similar tests were carried out in the same manner, but using a composition consisting of the carrier and of the antifoaming agent protected either with paraffin or with fatty acids.

The efficiency was measured as the height of the foam (Table III) which appeared during a washing cycle in a domestic front-loading washing machine enabling the foam levels to be observed visually on a scale. The program had a washing phase, the temperature of which changed from ambient to 90° C.-95° C.; the formulations were tested at 6 g/liter in the presence of a wash load of about 5 kg.

The best results after storage for one month at 40° C. were those obtained in tests Nos. 13, 14 and 16.

TABLE II

| COMPOSITION OF THE ANTIFOAMING COMPOSITION (Table II): | | | | | | | |
|---|---|---|---|---|---|---|---|
| CARRIER REFERENCE | | 1 | 2 | | 3 | | 4 |
| Carrier weight % | | 85 | 85 | 85 | 70 | 70 | 85 |
| Silicone composition % | | 15 | 15 | 15 | 15 | 15 | 15 |
| Fatty acid % (50/50 Lauric acid and stearic acid) | | 0 | 0 | 0 | 15 | 0 | 0 |
| Paraffins % | | 0 | 0 | 0 | 0 | 15 | 0 |
| | % active material in the wash | Test Number | | | | | |
| Before storage of the antifoaming composition in the wash formulation | 0.05 | | | 7 | | | |
| | 0.10 | | | 8 | | 15 | |
| | 0.30 | 1 | 4 | 9 | | | 17 |
| | 0.50 | 2 | 5 | | | | 18 |
| After storage of the antifoaming composition by itself | 0.30 | 3 | 6 | 10 | | | 19 |
| After storage (1 month at 40° C.) of the antifoaming composition in the wash formulation | 0.05 | | | 11 | | | |
| | 0.10 | | | 12 | | | |
| | 0.30 | | | 13 | 14 | 16 | |

TABLE III

| MACHINE TEST (TABLE III): FOAMING HEIGHT IN CM | | | |
|---|---|---|---|
| Time Temperature | 10 minutes 30° C. | 30 minutes 70° C. | 55 minutes 90° C. |
| 1 | 4 | 12 | >22 |
| 2 | 1 | 4 | 12 |
| 3 | 4 | 4 | 12 |
| 4 | 2 | 6 | >22 |
| 5 | 1 | 2 | 12 |
| 6 | 2 | 0 | 6 |
| 7 | >22 | 0 | 1 |
| 8 | 14 | 1 | 1 |
| 9 | 2 | 0 | 10 |
| 10 | 2 | 0 | 0 |
| 11 | overflow | overflow | 2 |
| 12 | >22 | >22 | 6 |
| 13 | 12 | 0 | 1 |
| 14 | 14 | 4 | 10 |
| 15 | 6 | 0 | 0 |
| 16 | 8 | 0 | 1 |
| 17 | 6 | 4 | 18 |
| 18 | 1 | 0 | 8 |
| 19 | 4 | 0 | 1 |

COMPARATIVE EXAMPLE

A comparative test was carried out using a substance composed of 80% of carrier consisting of hydrated tripolyphosphate without pyrophosphate and using the same antifoaming composition (20%) as incorporated previously in a wash formulation in a proportion of 0.3% of active material and aged for 1 month at 40° C.

TABLE IV

| TIME | 10 MINUTES | 30 MINUTES | 55 MINUTES |
|---|---|---|---|
| TEMPERATURE | 30° C. | 70° C. | 90° C. |

TABLE IV-continued

| TIME | 10 MINUTES | 30 MINUTES | 55 MINUTES |
|---|---|---|---|
| FOAM HEIGHT IN CM | 16 | >22 | 8 |

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter adapted as a carrier for liquid component materials, comprising (i) 54-67% by weight sodium tripolyphosphate, and (ii) 12-23% by weight sodium hydrogen orthophosphate, sodium hydrogen pyrophosphate, or admixture thereof, wherein said sodium tripolyphosphate fraction comprises at least 50% of phase 1 and is formed by spraying.

2. The composition of matter as defined by claim 1, comprising a granular sodium tripolyphosphate fraction, the particle sizes of which having a mean diameter of approximately 300 μm.

3. The composition of matter as defined by claim 1, said sodium tripolyphosphate fraction having an apparent density of from 0.3 to 0.6.

4. The composition of matter as defined by claim 1, comprising (i) sodium tripolyphosphate and (ii) sodium hydrogen pyrophosphate.

5. The composition of matter as defined by claim 4, comprising, by weight:

| | |
|---|---|
| anhydrous sodium tripolyphosphate | 54-67% |
| water | 18-23%. |

6. The composition of matter as defined by claim 5, comprising, by weight:

| | |
|---|---|
| anhydrous sodium tripolyphosphate | 58-67% |
| sodium hydrogen pyrophosphate | 12-20% |
| water | 18-23%. |

7. The composition of matter as defined by claim 6, comprising, by weight:

| | |
|---|---|
| anhydrous sodium tripolyphosphate | 60-65% |
| sodium hydrogen pyrophosphate | 15-18% |
| water | 20-22%. |

8. A process for the preparation of the composition of matter as defined by claim 1, comprising spraying water onto a mixture of (i) anhydrous sodium tripolyphosphate and (ii) sodium hydrogen orthophosphate, sodium hydrogen pyrophosphate, or admixture thereof.

9. A process for the preparation of the composition of matter of claim 1, comprising spraying a solution of sodium hydrogen pyrophosphate, sodium hydrogen orthophosphate, or admixture thereof, onto anhydrous sodium tripolyphosphate.

10. An antifoaming formulation comprising a liquid component antifoaming agent and, as a carrier material therefor, the composition of matter as defined by claim 1.

11. The antifoaming formulation as defined by claim 10, said liquid component antifoaming agent comprising an organopolysiloxane and a silica.

12. The antifoaming formulation as defined by claim 10, comprising:

(a) 100 parts of an organopolysiloxane oil of the formula $R_1SiO(R_2SiO)_nSiR_3$, in which $R_1$, $R_2$ and $R_3$, which are identical or different, are each methyl, ethyl, vinyl or phenyl radicals, at least 80% of said radicals being methyl radicals, and n is an integral or fractional number such as to provide a viscosity of 20 mPa.s to 50,000 mPa.s at 25° C.; and (b) 0.05 to 15 parts of finely-divided silica particulates having a mean diameter of less than 0.1 micron.

13. The antifoaming formulation as defined by claim 10, comprising up to about 15% by weight of said antifoaming agent relative to the carrier.

14. A process for the preparation of the antifoaming formulation as defined by claim 10, comprising intimately admixing said antifoaming agent with said carrier.

15. A process for the preparation of the antifoaming formulation as defined by claim 10, comprising spraying an aqueous emulsion of said antifoaming agent onto an anhydrous mixture of (i) sodium tripolyphosphate and (ii) sodium hydrogen pyrophosphate, sodium hydrogen orthophosphate, or admixture thereof.

16. A detergent composition comprising an antifoaming effective amount of the antifoaming formulation as defined by claim 10.

17. The detergent composition as defined by claim 16, comprising from 0.15 to 0.5% by weight of said antifoaming formulation, expressed as active antifoaming agent, relative to the total weight of the detergent composition.

18. The detergent composition as defined by claim 16, comprising a sodium alkylarylsulfonate and a nonionic surfactant.

19. A composition of matter adapted as a carrier for liquid component materials, comprising (i) 54–67% by weight sodium tripolyphosphate, (ii) 12–23% by weight sodium hydrogen orthophosphate, sodium hydrogen pyrophosphate, or admixture thereof, and (iii) 18–23% by weight water wherein said sodium tripolyphosphate fraction comprises at least 50% of phase 1 and is formed by spraying.

* * * * *